Nov. 28, 1939.   F. W. BURGER   2,181,364
WHEEL ASSEMBLY
Filed May 15, 1936   2 Sheets-Sheet 2

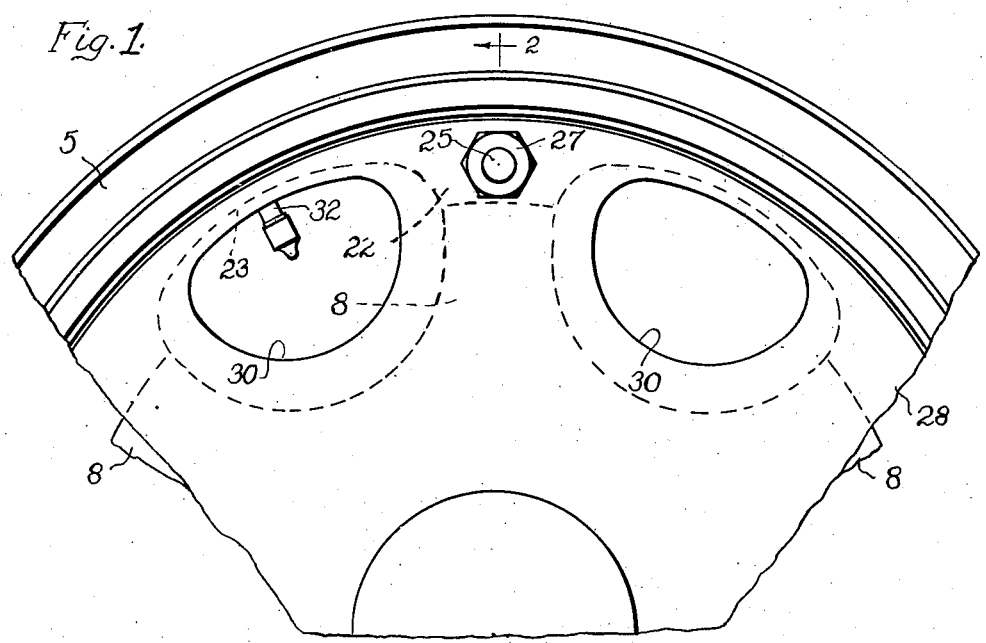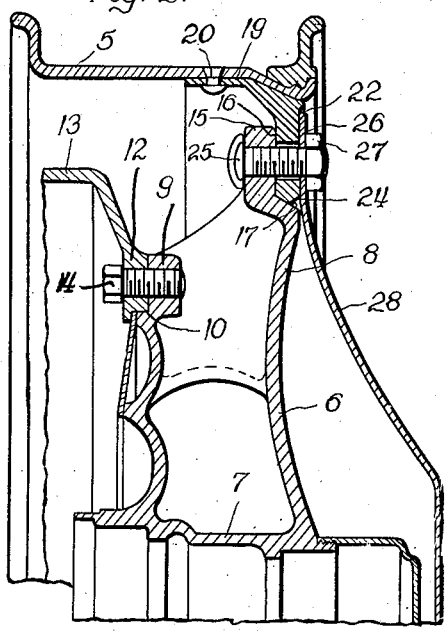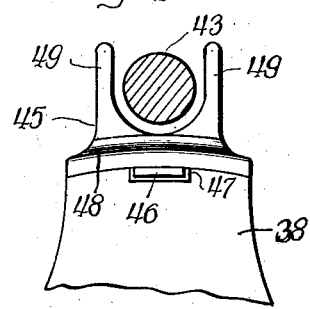

Inventor
Frederick W. Burger
By *Marr, Jackson, Botteker-Dunner*
Attys

UNITED STATES PATENT OFFICE 2,181,364

WHEEL ASSEMBLY

Frederick W. Burger, Niles, Mich., assignor to Clark Equipment Company, Buchanan, Mich., a corporation of Michigan Application May 15, 1936, Serial No. 79,828

8 Claims. (Cl. 301—13)

This invention relates to wheel assemblies, and more particularly is directed to an assembly which employs a wheel spider having radially extending spokes upon which a tire rim is mounted in fixed position, holding it against lateral or radial inward movement.

It is the primary object of the present invention to provide an assembly in which the wheel spider can be roughly finished and requires little machining in order to produce a positive supporting structure for a tire rim.

Another object attained by the present invention is the provision of a wheel structure which simulates the appearance of a disc wheel, but in which the tire rim is supported against radial loads by mounting it at the free ends of the spokes of a wheel spider.

A still further object of the present invention is the provision of a tire rim having a reinforcing flange which serves to mount the rim positively on the wheel body, and yet permits chording of the rim intermediate the spoke ends.

Another feature of the present invention is the provision of a construction which can be utilized either for single or dual wheel mountings, and which serves to positively aline and maintain the tire rims in proper position on the wheel spider.

Other objects and advantages of the present invention will appear more fully from the following detailed description which, taken in conjunction with the accompanying drawings, will disclose to those skilled in the art the particular construction and operation of the preferred form of the present invention.

In the drawings:

Figure 1 is a front elevational view of a wheel embodying the present invention;

Figure 2 is a sectional view taken substantially on line 2—2 of Figure 1 showing the mounting of a single tire rim according to the present invention;

Figure 4 is a front elevational view of the spacing member shown in Figure 3.

Figure 3:
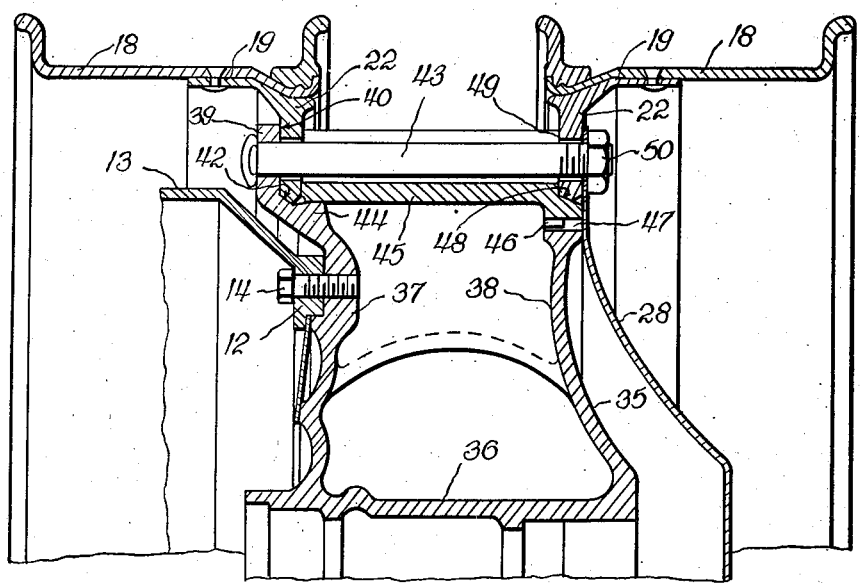
Figure 3 is a corresponding view illustrating a dual wheel assembly.

Referring now in detail to the drawings, I have provided a tire rim 5 which is supported upon a wheel spider, indicated generally at 6. The spider 6 is provided with a hub portion 7 having the radially extending spokes 8.

At the rear of each of the spokes 8, there is provided an enlarged boss portion 9 forming an alining shoulder 10 adapted to receive the head flange 12 of a brake drum 13 which is secured to the boss portion 9 by means of the bolts 14.

At the outer end of each of the spokes 8 there is provided a radially extending flange 15 having a radial surface 16 terminating at its radial inner end in an outwardly tapered wedge surface 17 sloping axially inwardly toward the outboard side of the wheel.

The tire rim 5, which may be of the beveled gutter type, is provided with a rolled sheet metal member or casting 19 which may be riveted as at 20, to the inner surface of the rim, and which has radially inwardly extending portions 22 forming a radially inwardly extending peripheral flange that is cut away between the spokes in order to accommodate chording of the rim. This cut-away portion is indicated at 23 in Figure 1. The inner end of the portions 22 of the flange is beveled in opposite directions as shown at 24 in Figure 2 corresponding to the taper of the surface 17.

A suitable clamping stud 25 extends axially through the radial wall 15 of the spoke 8, and the flange 22 is apertured, as at 26, to receive this bolt. A nut 27 is threaded on the outer end of the bolt and bears against the radial surface of the flange 22 for wedging the beveled edge of this flange along the tapered surface 17. This wedging movement tends to spread the rim radially and produces chording of the rim between the spokes. As the flange 22 is moved against the defining abutment surface 16 of the wall 15, the rim becomes definitely alined in lateral position on the wheel spider, and also is wedged tightly in position on the spoke ends.

If desired, a suitable closure member 28 may be provided which encloses the entire outboard side of the wheel spider and has its periphery extending substantially to the rim 18. This member 28 may be a light weight sheet metal stamping which is provided with suitable peripheral openings alining it for clamping engagement between the flange 22 and the nut 27. The member 28 may be cut out intermediate the spokes as indicated at 30 in Figure 1, to provide a spokelike appearance and to allow access to the valve stem 32 carried by the tire mounted on the rim 18. The outer surface of the member 28 may be chrome-plates or painted in any desired color combination to produce a decorative appearance for the outboard side of the wheel.

Considering now the dual wheel assembly shown in Figure 3, the wheel spider 35 is provided with the hub portion 36 adapted to be mounted on an axle housing arm or the like, and is also provided with a boss portion 37 on the rear face of the extending spoke portions 38. This boss portion is adapted to receive a brake drum in the same manner as described in connection with Figure 2.

The rear wall of the spoke 38 is provided with a laterally offset radially extending wall 39 having the abutment surface 40 and having the tapered wedge surface 42. A tire rim 18 corresponding to the rim 5 shown in Figure 2 and provided with the corresponding member 19 secured thereto and having the radially inwardly extending flange 22, is adapted to have engagement with the wedge surface 42 for mounting it in an overhanging position with respect to the wall 39. An elongated clamping bolt 43 extends through the wall 39 and the flange 22, and is transversely projected to the outboard side of the front wall of the spoke 38. A suitable U-shaped spacing member 45, shown in detail in Figure 4, has abutting engagement at its rear surface with the outer face of the flange 22 of the rim 18, and rests upon the ledge 44 terminating the tapered surface 42. This member 45 extends forwardly across to, and has interlocking engagement with the front portion of the spoke 38. The radial inner surface of the member 45 is arcuately shaped to correspond to the arcuate shape of the spoke ends, and has a depending tongue portion 46 which is adapted to have keying engagement in the cutaway groove 47 formed in the outer peripheral portion of the spoke. At its outer end, the member 45 has a tapered wedge surface 48 adapted to receive the flange 22 of a second rim 18, and is also provided with the abutting radially extending faces 49 for limiting axial inward movement of the flange 22. A suitable nut 50 is threaded over the projecting end of the bolt 43 and when tightened, serves to force the member 45 against the outer face of the flange 22 of the inboard rim to wedge the same in position on the surface 42, and at the same time, forces the flange 22 of the outboard rim 18 into wedging engagement with the surface 48 to chord the two rims into fixed position on the spoke ends. At the same time, the entire assembly moves axially inwardly until the inboard side of the inboard rim flange 22 abuts the surface 40 of the radially extending wall 39, and the inboard side of the flange 22 of the outboard rim abuts against the radial surfaces 49 of the member 45. This serves to definitely space the rims laterally, and at the same time, to mount them in definite position with respect to the wheel spider.

Figure 5:
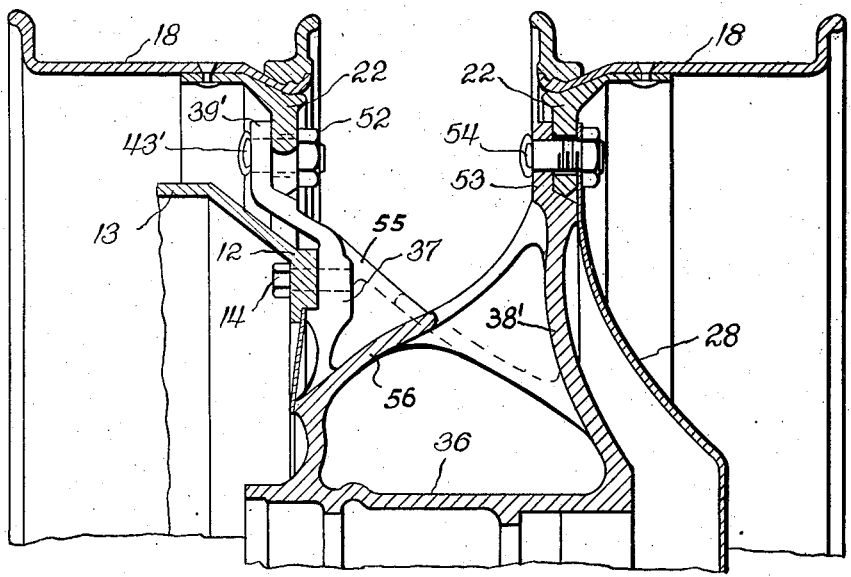
Figure 5 is a modified construction illustrating another manner of carrying out the invention.

In an optional form of the invention as shown in Figure 5, the spoke ends are offset circumferentially, the rear wall 39' of the spoke being adapted to receive a short stud 43' which carries the nut 52 for clamping the inboard rim in position in the manner shown in Figure 2. Similarly, the outer portion of the spoke 38' is provided with a second radially extending wall 53 having a short clamping stud 54 extending therethrough which is adapted to clamp the outboard rim in position in substantially the manner shown in Figure 2. In this embodiment of the invention, each of the rims is separately clamped into properly alined position against radially extending walls formed on the wheel spider, these walls being circumferentially spaced so that access may be had to the rear walls from a point intermediate adjacent front walls. Suitable reinforcing ribs 55 and 56 are provided between the walls 39' and 53 for cross-bracing these walls to add rigidity and strength to the wheel assembly.

It is therefore apparent that I have provided a novel wheel assembly embodying certain features of constuction and design which render its use economical and facilitate the proper alining of the rims on the wheel spider with the minimum of parts, and also without requiring any extensive machine operations on either the rim flanges or the spoke ends. The member 45 may preferably be formed as a malleable casting which can be sufficiently accurate so that the only machining required is on the tapered surface 48. Similarly, if the members 19 are formed of rolled sheet metal stock, they may be coined in such manner as to provide the proper tapered surfaces 24 without any further machining so that the construction of the component parts is relatively economical and capable of mass production.

I do not intend to be limited to the exact details of the construction shown and described herein, but only in so far as defined by the scope and spirit of the appended claims.

What I claim is:

1. A wheel assembly comprising a wheel spider having laterally spaced radially extending spoke defining walls, the wall at the inboard side of said spider having beveled seats adjacent the ends of the spokes, a clamping bolt at each spoke end extending axially thereacross, a pair of tire rims having radially inturned flanges at their adjacent lateral edges, one of said rims being mounted on said inboard wall and the flange thereof being wedges radially outwardly on said seats, a clamping member embracing each of said bolts and held against the outer surface of the flange of said inboard rim, said member having at its outboard side a corresponding beveled seat for receiving the flange of the other rim, and means engaging said bolt for securing said rim flanges and clamping member rigidly to said spider.

2. A dual wheel assembly comprising a wheel spider having radially extending spoke portions each terminating at its outer end in an inboard radially extending transverse wall having an outwardly beveled seat and a spaced outboard wall portion having a radial length less than the radial distance to said seat, a clamping bolt extending axially through said transverse wall and projecting axially outwardly of said outboard wall, a tire rim having a flange portion apertured about said bolt and having lateral abutting engagement with said transverse wall, a second corresponding tire rim, spacing means between said rims and having a radially outwardly directed channel portion partially embracing said bolt, said spacing means supporting said second rim on said outboard wall and having abutting lateral engagement with the flange of the inboard rim, and interlocking engagement between said outboard wall and said spacing means to prevent relative circumferential movement therebetween.

3. Spacing means for a dual wheel assembly of the class described comprising a channel shaped member having a transverse extending abutment surface at one end, and a corresponding abutment surface at the opposite end terminating at one edge in an axially outwardly extending projection having a beveled surface leading to said abutment surface.

4. Spacing means for a dual wheel assembly comprising an elongated member of generally U-shaped section, an abutment surface extending transversely across one end of said member, and a second parallel abutment surface formed by the leg portions of said member at its opposite end, the base of said member at said opposite end being projected axially outwardly beyond said associated abutment surface to form a tapered rim flange receiving seat leading up to said abutment surface.

5. Spacing means for a dual wheel assembly comprising an elongated extending member of generally U-shaped section, an abutment surface extending transversely across one end of said member, a second parallel abutment surface formed by the leg portions of said member at its opposite end, the base of said member at said opposite end being projected axially outwardly beyond said abutment surface to form a tapered rim flange receiving seat leading up to said abutment surface, and a downwardly offset tongue below said surface for keying said spacing means to a portion of said wheel assembly.

6. In a dual wheel and rim assembly, a wheel body having spoke ends formed with an inboard radially extending wall and a short axially extending shoulder at the innermost end thereof, an outboard wall of a radial extent substantially equal to that of said shoulder, a pair of tire rims, each provided at one lateral edge thereof with a series of circumferentially spaced radially inwardly extending apertured bosses, one of said rims being adapted for mounting with the bosses thereof adjacent the outboard face of said inboard wall and overhanging said wall laterally inwardly, a clamping bolt supported in said wall and extending through the associated boss through the outboard side of said spoke, a spacing lug having an outwardly directed U-shaped portion embracing the intermediate portion of said bolt and having an inboard end laterally abutting against said boss and supported on said shoulder, the outboard end of said lug being disposed in axial alinement with the outboard wall of said spoke and having a radial wall with an axial shoulder at the radially innermost end thereof, said second tire rim having the bosses thereof abutting laterally against said radial wall of said lug, and a nut on said bolt for forcing said rim bosses laterally inwardly against said radial walls of said spoke end and said lug.

7. The assembly of claim 6 further characterized in the provision of interlocking means between said lug and said outboard spoke wall preventing relative circumferential movement therebetween.

8. In combination, a wheel body having spoke portions terminating in axially spaced circumferentially extending walls, the inboard wall having an axially inwardly offset portion with radially extending bosses projecting therefrom, bolts carried by said bosses and extending transversely across the outboard wall, a pair of tire rims each having radially inwardly directed lug portions at one lateral edge thereof apertured to receive said bolts, one of said rims being mounted about said offset portion with said lug portions against the outboard surfaces of said bosses and laterally inwardly overhanging said bosses, and a series of spacing lugs partially embracing each of said bolts and having abutment surfaces at one end thereof pressing said lug portions of said one rim against said bosses, and having a radial surface at the opposite end for receiving the lug portions of the other rim in abutment thereagainst, and nut means on said bolts for clamping said other rim against said radial surface and for moving said lugs axially along said bolt to clamp the first rim in fixed position.

FREDERICK W. BURGER.